(12) United States Patent
Roth

(10) Patent No.: US 12,083,363 B2
(45) Date of Patent: Sep. 10, 2024

(54) OXYGEN MASK INFANT ADAPTER

(71) Applicant: B/E AEROSPACE, INC., Winston Salem, NC (US)

(72) Inventor: Kyle Roth, Winston Salem, NC (US)

(73) Assignee: B/E AEROSPACE, INC., Winston Salem, NC (US)

( * ) Notice: Subject to any disclaimer, the term of this patent is extended or adjusted under 35 U.S.C. 154(b) by 635 days.

(21) Appl. No.: 17/325,042

(22) Filed: May 19, 2021

(65) Prior Publication Data

US 2022/0296938 A1    Sep. 22, 2022

Related U.S. Application Data

(60) Provisional application No. 63/163,303, filed on Mar. 19, 2021.

(51) Int. Cl.
| | | |
|---|---|---|
| *A62B 18/02* | (2006.01) | |
| *A62B 7/14* | (2006.01) | |
| *B64D 11/00* | (2006.01) | |

(52) U.S. Cl.
CPC .............. *A62B 18/025* (2013.01); *A62B 7/14* (2013.01); *B64D 11/00* (2013.01); *B64D 2231/025* (2013.01)

(58) Field of Classification Search
CPC ....... A62B 18/00; A62B 18/02; A62B 18/025; A62B 18/08; A62B 18/084; A62B 7/00; A62B 7/14; B64D 11/00; B64D 2231/00; B64D 2231/02; B64D 2231/025; A61M 16/06; A61M 16/0605; A61M 2016/0661
See application file for complete search history.

(56) References Cited

U.S. PATENT DOCUMENTS

| | | | |
|---|---|---|---|
| 3,182,659 A | 5/1965 | Blount | |
| 5,121,745 A | 6/1992 | Israel | |
| 5,513,626 A | 5/1996 | Hamilton | |
| 2002/0078953 A1* | 6/2002 | Fecteau ............... | A62B 18/084 |
| | | | 128/207.11 |
| 2003/0101997 A1* | 6/2003 | Farin ....................... | A62B 7/14 |
| | | | 128/205.25 |
| 2005/0150495 A1 | 7/2005 | Rittner et al. | |
| 2012/0199130 A1 | 8/2012 | Euvrard et al. | |
| 2018/0361101 A1* | 12/2018 | Frerichs ............ | A61M 16/0638 |
| 2019/0152610 A1* | 5/2019 | Rittner ................... | A62B 18/08 |
| 2020/0129718 A1* | 4/2020 | Ritz ................... | A61M 16/0683 |

FOREIGN PATENT DOCUMENTS

| | | |
|---|---|---|
| CA | 2409039 | 11/2001 |
| CN | 211096839 | 7/2020 |

OTHER PUBLICATIONS

European Patent Office, European Search Report dated Nov. 2, 2022 in Application No. 22162197.2.
European Patent Office, European Partial Search Report dated Aug. 1, 2022 in Application No. 22162197.2.

\* cited by examiner

*Primary Examiner* — Colin W Stuart
(74) *Attorney, Agent, or Firm* — SNELL & WILMER L.L.P.

(57) ABSTRACT

An infant mask adapter for an emergency oxygen mask system is provided. The infant mask adapter includes a body extending between a base end and a face end, the body defining a cavity therewithin and open through the face end and the base end, a coupling portion proximate the base end, a shoulder portion between the coupling portion and the face end, and a bell mouth portion extending from the shoulder portion to the face end.

17 Claims, 3 Drawing Sheets

OXYGEN MASK INFANT ADAPTER

CROSS-REFERENCE TO RELATED APPLICATIONS

This application claims priority to, and the benefit of, U.S. application Ser. No 63/163,303 filed Mar. 19, 2021 and entitled "OXYGEN MASK INFANT ADAPTER," which is incorporated by reference herein in its entirety for all purposes.

FIELD

The present disclosure is directed to passenger oxygen masks such as oxygen masks used in aircraft.

BACKGROUND

In the aircraft of almost all airlines an oxygen mask is provided for each passenger seat in the case of an emergency situation of a sudden drop in cabin pressure occurring during flight at high altitude. Such masks are generally sized to fit and seal over the nose and the mouth of an adult passenger. However, such masks may be too large for an infant passenger without intervention from a guardian.

SUMMARY

An infant mask adapter for an emergency oxygen mask system is described herein, in accordance with various embodiments. An infant mask adapter may comprise a body extending between a base end and a face end, the body defining a cavity therewithin and open through the face end and the base end, a coupling portion proximate the base end, a shoulder portion between the coupling portion and the face end, and a bell mouth portion extending from the shoulder portion to the face end.

In various embodiments, the body comprises a hard plastic portion. In various embodiments, the body comprises an overmolded portion. In various embodiments, the coupling portion comprises a toothed ring. In various embodiments, the coupling portion includes the hard plastic portion. In various embodiments, the overmolded portion includes the bell mouth portion. In various embodiments, the bell mouth portion comprises silicone. In various embodiments, the bell mouth portion is overmolded over the shoulder portion.

An emergency oxygen mask system for use with an aircraft is also provided. The system may comprise an oxygen mask comprising a valve plate and an oronasal cup, and an infant mask adapter disposed within the oronasal cup, comprising a body extending between a base end and a face end, the body defining a cavity therewithin and open through the face end and the base end, a coupling portion proximate the base end, a shoulder portion between the coupling portion and the face end, and a bell mouth portion extending from shoulder portion to the face end.

In various embodiments, the body comprises a hard plastic portion. In various embodiments, the body comprises an overmolded portion. In various embodiments, the coupling portion includes the hard plastic portion and comprises a toothed ring. In various embodiments, in response to inserting the coupling portion into the oronasal cup, the toothed ring expands the oronasal cup around the toothed ring to generate an interference seal. In various embodiments, the coupling portion is configured to retain the base end of the body within the oronasal cup and proximate the valve plate. In various embodiments, the bell mouth portion comprises a reduced diameter at the face end less than that of the oronasal cup diameter. In various embodiments, the reduced diameter is defined by an area sufficient to cover only the nose and the mouth of an infant passenger.

An article of manufacture is also provided. The article of manufacture includes a body extending between a base end and a face end, the body defining a cavity therewithin and open through the face end and the base end, a coupling portion proximate the base end, a shoulder portion between the coupling portion and the face end, and a bell mouth portion extending from shoulder portion to the face end and sized to cover the nose and mouth of an infant.

In various embodiments, the coupling portion is disposed on an outer perimeter of the body. In various embodiments, the coupling portion comprises a first toothed ring, a second toothed ring, and a third toothed ring, wherein the outer diameter of each toothed ring progressively increases as the spacing between the toothed rings and the base end increases. In various embodiments, the coupling portion and the shoulder portion comprise a hard plastic portion of the body. In various embodiments, the bell mouth portion comprises silicone and is overmolded over the shoulder portion.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

The present disclosure relates to passenger oxygen mask adapters for infants and small children. The adapter may be configured to fit inside existing passenger oxygen masks to aid in the delivery of oxygen. The adapter may be configured to fit an infant's face better than the existing adult size mask by not covering the eyes or extending on to the neck of the infant. The adapter may configured to seal only around the nose and mouth of the infant and thereby tend to inhibit leakage of oxygen. Existing masks may have straps configured to fit over an adult passenger's head which but which would be too loose when placed over the head of an infant passenger. The adapter may increase the overall length of the combined mask and adapter system and thereby tends to enable existing straps to fit properly over the head of an infant passenger.

Figure 1:
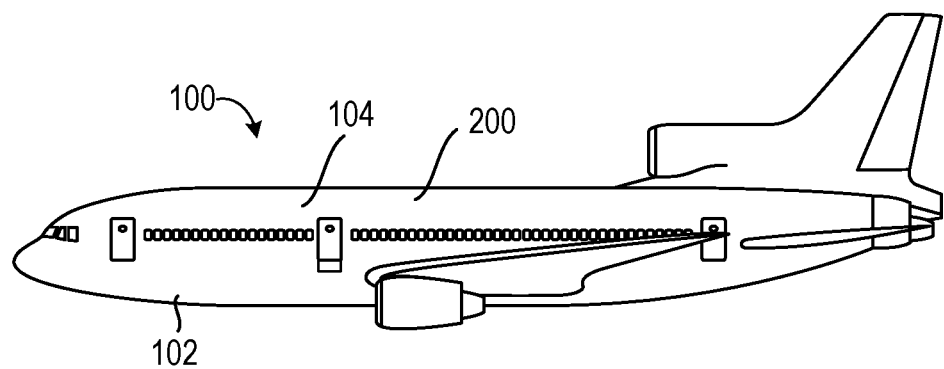
FIG. 1 illustrates a perspective view of an aircraft having an emergency oxygen mask system, in accordance with various embodiments.
Figure 2:
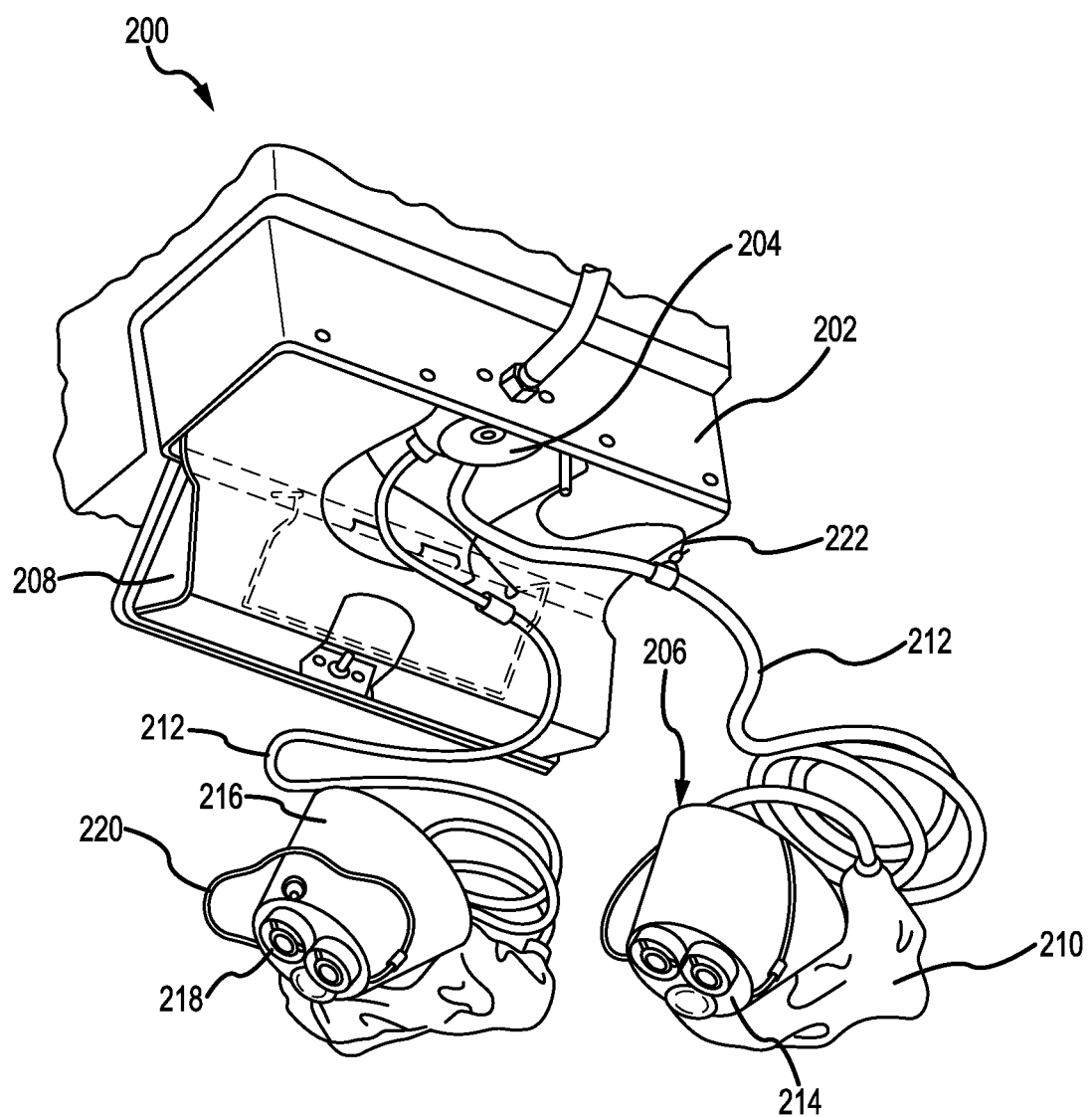
FIG. 2 illustrates an emergency oxygen mask system of an aircraft, in accordance with various embodiments.

Referring to FIG. 1 and FIG. 2, an aircraft 100 is shown, in accordance with various embodiments. Aircraft 100 may include a fuselage 102 having a passenger cabin 104. Aircraft 100 may include one or more emergency oxygen mask systems 200 positioned above the seats within the passenger cabin 104. In the event of an emergency, passenger oxygen masks may be deployed by the emergency oxygen mask system 200.

With additional reference to FIG. 2 an emergency oxygen mask system 200 is illustrated in accordance with various embodiments. Oxygen mask system 200 may comprise a storage container 202, a fluid valve assembly 204, an oronasal oxygen mask 206, and a system, generally indicated at 208, for supporting the oxygen masks 206 thereon in a stowed condition within the container 202. The fluid valve assembly 204 may be in fluid communication with an oxygen supply configured to supply breathable oxygen to the mask 206. In various embodiments, oxygen masks 206 may be in fluid communication with an oxygen reservoir bag 210 which may be fed breathable oxygen via a flexible oxygen supply line 212.

It will be appreciated that the masks 206 are stowed in such a way that, in response to deployment, the masks 206 should drop free without binding or tangling of the mask and lines. In various embodiments, lanyards 222 may be coupled to the lines 212 and may assist with reducing the potential for binding and/or tangling of the lines. In various embodiments, pulling on the lanyard 222 may enable the flow of oxygen from the oxygen supply to the fluid valve assembly 204. In various embodiments, the oxygen mask 206 may comprise a valve plate 214 and an oronasal cup 216 configured to fit over the nose and mouth of an adult passenger. Valve plate 214 may include one or more valves 218 such as an exhalation valve, an inhalation mixing valve, and/or an oxygen inlet valve. In various embodiments, a strap 220 may be coupled to the valve plate 214 and or the cup 216. The strap 220 may be one of an elastic type or an adjustable type configurable to pass over the head of the passenger and retain the cup 216 over the passenger's nose and mouth. In various embodiments, an infant mask adapter 300 (not shown in FIG. 2) may be inserted into the cup 216.

Figure 3:
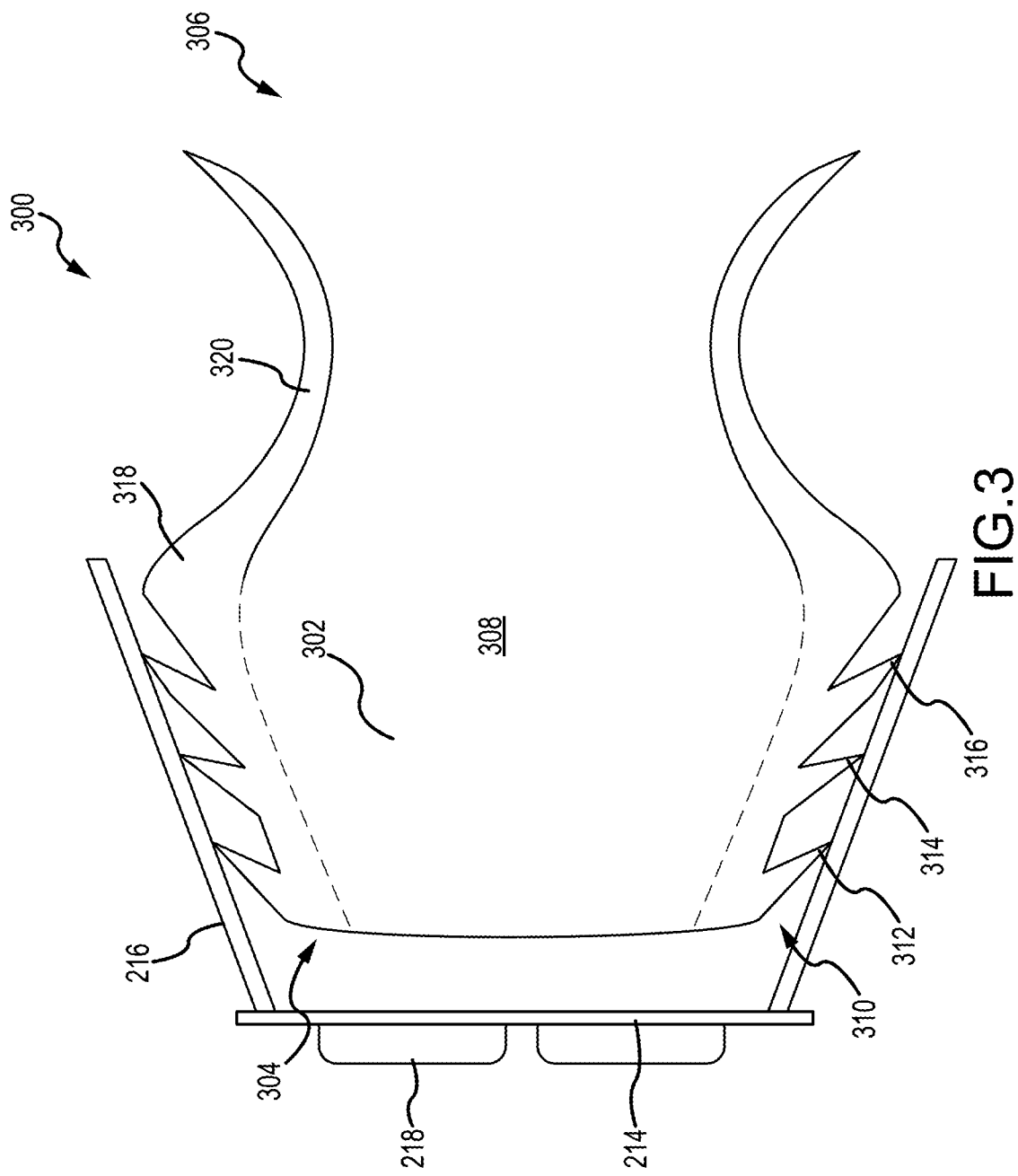
FIG. 3 illustrates an infant mask adapter for an emergency oxygen mask, in accordance with various embodiments.

In various embodiments and with additional reference to FIG. 3, an infant mask adapter 300 is shown in cross-section and inserted into cup 216 of mask 206. In various embodiments, adapter 300 comprises a body 302 extending between a base end 304 and a face end 306. In various embodiments, body 302 may comprise a hard plastic injection molding and may have one or more elastomeric over molded portions. Body 302 is hollow and defines a cavity 308 therewithin open at the plane of the base end 304 and the plane of the face end 306. In this regard, fluid communication is enabled between the valve plate 214 and the face end 306 via the cavity 308 defined by the body 302. Body 302 may include a coupling portion proximate the base end 304, indicated generally at 310, for securing the body 302 within the cup 216. In various embodiments, the body 302 of the adapter may be press fit into the cup 216 of the mas 206 and thereby secured via a interference and/or friction fit between the adapter body 302 and the cup 216.

In various embodiments, the coupling portion 310 may include a plurality of saw-toothed or v-rings seals (312, 314, 316) extending radially outward of the body 302 at base end 304. Each of the toothed rings 312, 314, 316 generally follow the contour of the interior of the cup 216 and may increase in diameter depending on the relative distance from the base end 304. In various embodiments, the outer diameter of each toothed ring 312, 314, 316 may be dependent upon the spacing between a given tooth ring 213, 314, and 316 from the base end 304. For example, a first toothed ring 312 may have a first outer diameter, a second toothed ring 314 may have a second outer diameter, and a third toothed ring 316 may have a third outer diameter greater, with the first outer diameter of the first toothed ring 312 being smaller than each of the second outer diameter (second toothed ring 314) and the third outer diameter (third toothed ring 316), and with the second outer diameter of the second toothed ring 314 being smaller the third outer diameter (third toothed ring 316). Stated another way, the outer diameter of the various toothed rings 312, 314, 316 may progressively increasing as the spacing between the toothed rings 312, 314, 315 and the base end 304 increases.

In various embodiments, the cup 216 may comprise an elastomeric material. The toothed rings 312, 314, 316 may comprise a hard material and may be relatively oversized with respect to the contour of the cup 216. For example, the coupling portion and/or the toothed rings 312, 314, 316 may comprise a hard plastic portion which has a hardness greater than that of the cup 216. In various embodiments, the rings 312, 314, 316 may be raked and/or angled to enable insertion but inhibit extraction. In this regard, when the base end 304 is inserted into the cup 216, the toothed rings may force cup 216 to expand around the respective toothed ring 312, 314, 316 and generate an interference seal against the ring 312, 314, 316. In this regard, the toothed rings 312, 314, 316 may provide a gas seal between the adapter 300 and the cup 216 to enable fluid communication between the valve plate 214 and the face end 306. In various embodiments, body 302 may comprise a shoulder portion 318 located relatively between the coupling portion 310 and the face end 306. In various embodiments, the shoulder portion 318 may be contoured to enable a passenger to grasp the adapter 300 and to apply sufficient insertion force to the coupling portion 310 to drive the coupling portion 310 into the cup 216 to place the base end 304 proximate the valve plate 214. In this regard, the shoulder portion may further comprise the hard plastic portion and thereby tend to enable transmission of the insertion force to the coupling portion 310. In various embodiments the coupling portion 310 may be configured to leave a gap between the valve plate 214 and the base end 304 in response to coupling with the cup 216. In this regard the coupling portion 310 may tend to inhibit contact between and/or interference between valves of the valve plate 214 and the adapter 300.

In various embodiments, a bell mouth portion 320 of the body 302 extends from the shoulder portion 318 to the face end 306. The bell mouth portion 320 may comprise an elastomeric material such as, for example, one of a silicone, a rubber, and/or the like. The bell mouth portion 320 may be configured reduce from the cup 216 diameter to a reduced diameter at the face end 306 sufficient to cover only the nose and the mouth of an infant passenger. In this regard, the reduced diameter of the bell mouth portion 320 at the face end 306 is less than that of the oronasal cup 216 and may be defined by an area sufficient to cover only the nose and the mouth of the infant passenger. The bell mouth portion 320 may further be configured to increase the overall length of the combined cup 216 and adapter 300. In various embodiments, the adapter 300 extends beyond the open end of the cup 216 (opposite the valve plate 214). In this regard, the bell mouth portion 320 protrudes beyond the open end of the cup 216 such that when placed over the mouth and nose of the infant passenger, the bell mouth portion 320 may place the valve plate 214 relatively further away from the infant passenger's face thereby providing additional tension in straps 220. Stated another way, the adapter 300 may be configured to interface with the facial features of an infant passenger. In various embodiments, the bell mouth portion 320 may be overmolded over the shoulder portion 318.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An infant mask adapter for an emergency oxygen mask system, comprising:
    a body extending between a base end and a face end, the body defining a cavity therewithin and open through the face end and the base end;
    a coupling portion proximate the base end, wherein the coupling portion comprises a first toothed ring, a second toothed ring, and a third toothed ring, wherein the outer diameter of each toothed ring progressively increases as the spacing between the toothed rings and the base end increases;
    a shoulder portion between the coupling portion and the face end; and
    a bell mouth portion extending from the shoulder portion to the face end.

2. The infant mask adapter of claim 1, wherein the body comprises a plastic portion.

3. The infant mask adapter of claim 2, wherein the coupling portion includes the plastic portion.

4. The infant mask adapter of claim 1, wherein the body comprises an overmolded portion.

5. The infant mask adapter of claim 4, wherein the overmolded portion includes the bell mouth portion.

6. The infant mask adapter of claim 5, wherein the bell mouth portion comprises silicone.

7. The infant mask adapter of claim 5, wherein the bell mouth portion is overmolded over the shoulder portion.

8. An emergency oxygen mask system for use with an aircraft, comprising:
    an oxygen mask comprising a valve plate and an oronasal cup; and
    an infant mask adapter disposed within the oronasal cup, wherein the infant mask adapter further comprises:
        a body extending between a base end and a face end, the body defining a cavity therewithin and open through the face end and the base end;
        a coupling portion proximate the base end;
        a shoulder portion between the coupling portion and the face end; and
        a bell mouth portion extending from the shoulder portion to the face end.

9. The emergency oxygen mask system of claim 8, wherein the body comprises a plastic portion.

10. The emergency oxygen mask system of claim 9, wherein the body comprises an overmolded portion.

11. The emergency oxygen mask system of claim 10, wherein the coupling portion includes the plastic portion and comprises a toothed ring.

12. The emergency oxygen mask system of claim 11, wherein in response to inserting the coupling portion into the oronasal cup, the toothed ring expands the oronasal cup around the toothed ring to generate an interference seal.

13. The emergency oxygen mask system of claim 8, wherein the coupling portion is configured to retain the base end of the body within the oronasal cup and proximate the valve plate.

14. The emergency oxygen mask system of claim 8, wherein the bell mouth portion extends beyond the oronasal cup and comprises a reduced diameter at the face end less than that of the oronasal cup diameter.

15. The emergency oxygen mask system of claim 14, wherein the reduced diameter is defined by an area sufficient to cover only the nose and the mouth of an infant passenger.

16. An article of manufacture, including:
a body extending between a base end and a face end, the body defining a cavity therewithin and open through the face end and the base end;
a coupling portion proximate the base end, wherein the coupling portion comprises a first toothed ring, a second toothed ring, and a third toothed ring, wherein the outer diameter of each toothed ring progressively increases as the spacing between the toothed rings and the base end increases;
a shoulder portion between the coupling portion and the face end; and
a bell mouth portion extending from the shoulder portion to the face end and sized to cover the nose and mouth of an infant.

17. The article of manufacture of claim 16, wherein the coupling portion is disposed on an outer perimeter of the body.

* * * * *